(12) United States Patent
Liang

(10) Patent No.: US 11,699,895 B2
(45) Date of Patent: Jul. 11, 2023

(54) SEMI-AUTOMATIC WIRING MACHINE

(71) Applicant: YUHONG ELECTRONIC (SHENZHEN) CO., LTD., Guangdong (CN)

(72) Inventor: Wei-Jen Liang, New Taipei (TW)

(73) Assignee: YUHONG ELECTRONIC (SHENZHEN) CO., LTD., Guangdong (CN)

( * ) Notice: Subject to any disclaimer, the term of this patent is extended or adjusted under 35 U.S.C. 154(b) by 153 days.

(21) Appl. No.: 17/364,408

(22) Filed: Jun. 30, 2021

(65) Prior Publication Data
US 2023/0006428 A1    Jan. 5, 2023

(51) Int. Cl.
*H02G 1/06* (2006.01)
(52) U.S. Cl.
CPC .................................... *H02G 1/06* (2013.01)
(58) Field of Classification Search
CPC . H01G 1/06; B23Q 1/01; B23Q 1/012; B23Q 1/015; B23Q 1/017; B23Q 1/25; B23Q 1/56; B23Q 1/62; B23Q 1/621; B23Q 1/623; B23Q 1/626
USPC ..................... 29/745, 825, 850; 254/134.3 R
See application file for complete search history.

(56) References Cited

U.S. PATENT DOCUMENTS

| 4,757,606 | A | * | 7/1988 | Eaton | H01R 43/20 29/748 |
| 5,400,503 | A | * | 3/1995 | Komoriya | H01L 21/3083 29/745 |
| 5,515,606 | A | * | 5/1996 | Albeck | H01R 43/01 29/850 |
| 2004/0074086 | A1 | * | 4/2004 | Yamaguchi | H01F 41/074 29/745 |

* cited by examiner

*Primary Examiner* — Monica S Carter
*Assistant Examiner* — Alberto Saenz
(74) *Attorney, Agent, or Firm* — Chun-Ming Shih; HDLS IPR Services

(57) ABSTRACT

A wiring machine includes a chassis, a shifting mechanism, a carrying mechanism and a wire leading mechanism. The chassis has a guide rail. The shifting mechanism is disposed on the guide rail and movable along the guide rail. The carrying mechanism is disposed under the guide rail and includes a tray movable along a direction perpendicular to the guide rail. The wire leading mechanism is connected to the shifting mechanism and movable in a direction perpendicular to the shifting mechanism. The wire leading mechanism includes a body, a wire conveying assembly disposed in the body and a wire leading head connected to the body. A wire is conveyed by the wire conveying assembly to be output by the wire leading head. Therefore, the wire may be rapidly and stably laid into different types and shapes depending on different requirements.

8 Claims, 6 Drawing Sheets

SEMI-AUTOMATIC WIRING MACHINE

BACKGROUND

Technical Field

The disclosure relates to a wiring machine, particularly to a semi-automatic wiring machine.

Related Art

With the development of technology, many goods are produced. In order to save costs, reduce workforce and increase quality, manufacturers introduce semi-automation and automation into various production equipment or producing processes. Workforce may be replaced with machine equipment to accomplish rapid and stable production.

When an electric wire is being laid into a coil, the wire is hard to be bent to a fixed shape because of the weak rigidity. Thus, the coil laying has certain difficulty and cannot be rapidly and stably implemented. How to rapidly and stably lay a wire on an applied carrier with a semi-automatic or automatic machine is needed to resolve above drawback.

SUMMARY

An object of the disclosure is to rapidly and stably lay a wire into different types and shapes depending on different requirements.

A wiring machine includes a chassis, a shifting mechanism, a carrying mechanism and a wire leading mechanism. The chassis has a guide rail. The shifting mechanism is disposed on the guide rail and movable in a first axial direction along the guide rail. The carrying mechanism is disposed under the guide rail and includes a tray movable along a second axial direction. The second axial direction is perpendicular to the first axial direction. The wire leading mechanism is connected to the shifting mechanism and movable in a third axial direction along the shifting mechanism. The third axial direction is perpendicular to both the first axial direction and the second axial direction. The wire leading mechanism includes a body, a wire conveying assembly disposed in the body and a wire leading head connected to the body. A wire is conveyed by the wire conveying assembly to be output by the wire leading head.

The disclosure further has the following functions. The wire may be laid on the carrier for the required shape by the movement of the shifting mechanism, the carrying mechanism and the wire leading mechanism. Rotation directions of the two driving rollers are opposite so as to output the wire through the wire leading hole. By the elastic member, the wire leading head may retract toward the chamber so as to prevent being fractured or damaged. The wire leading head returns to a fixed position by the elasticity of the elastic member when an external force is removed. By the arcuate cross-section of the pressing portion, the wire leading head may effectively press the wire to prevent the wire from warping.

In view of this, the inventors have devoted themselves to the above-mentioned related art, researched intensively and cooperated with the application of science to try to solve the above-mentioned problems. Finally, the disclosure which is reasonable and effective to overcome the above drawbacks is provided.

DETAILED DESCRIPTION

The technical contents of this disclosure will become apparent with the detailed description of embodiments accompanied with the illustration of related drawings as follows. It is intended that the embodiments and drawings disclosed herein are to be considered illustrative rather than restrictive.

Figure 1:
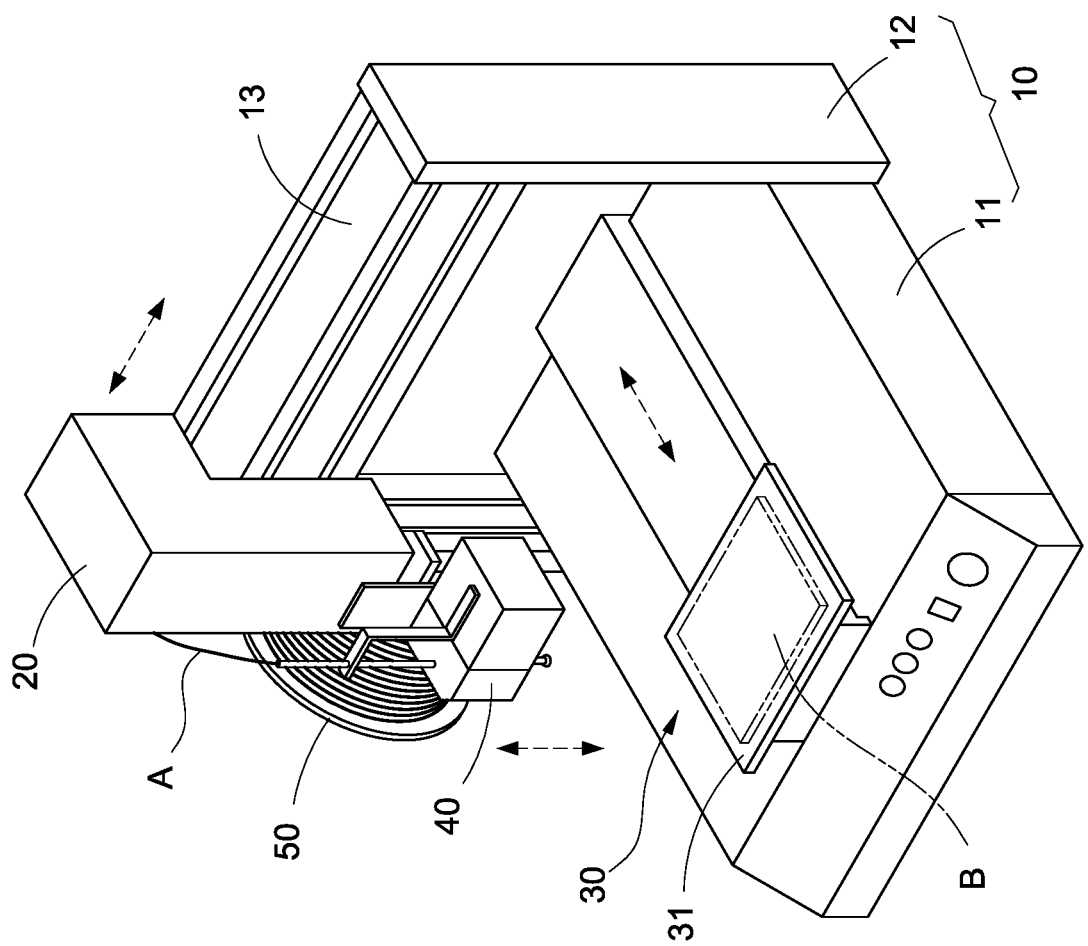
FIG. 1 is a perspective schematic view of the disclosure.
Figure 2:
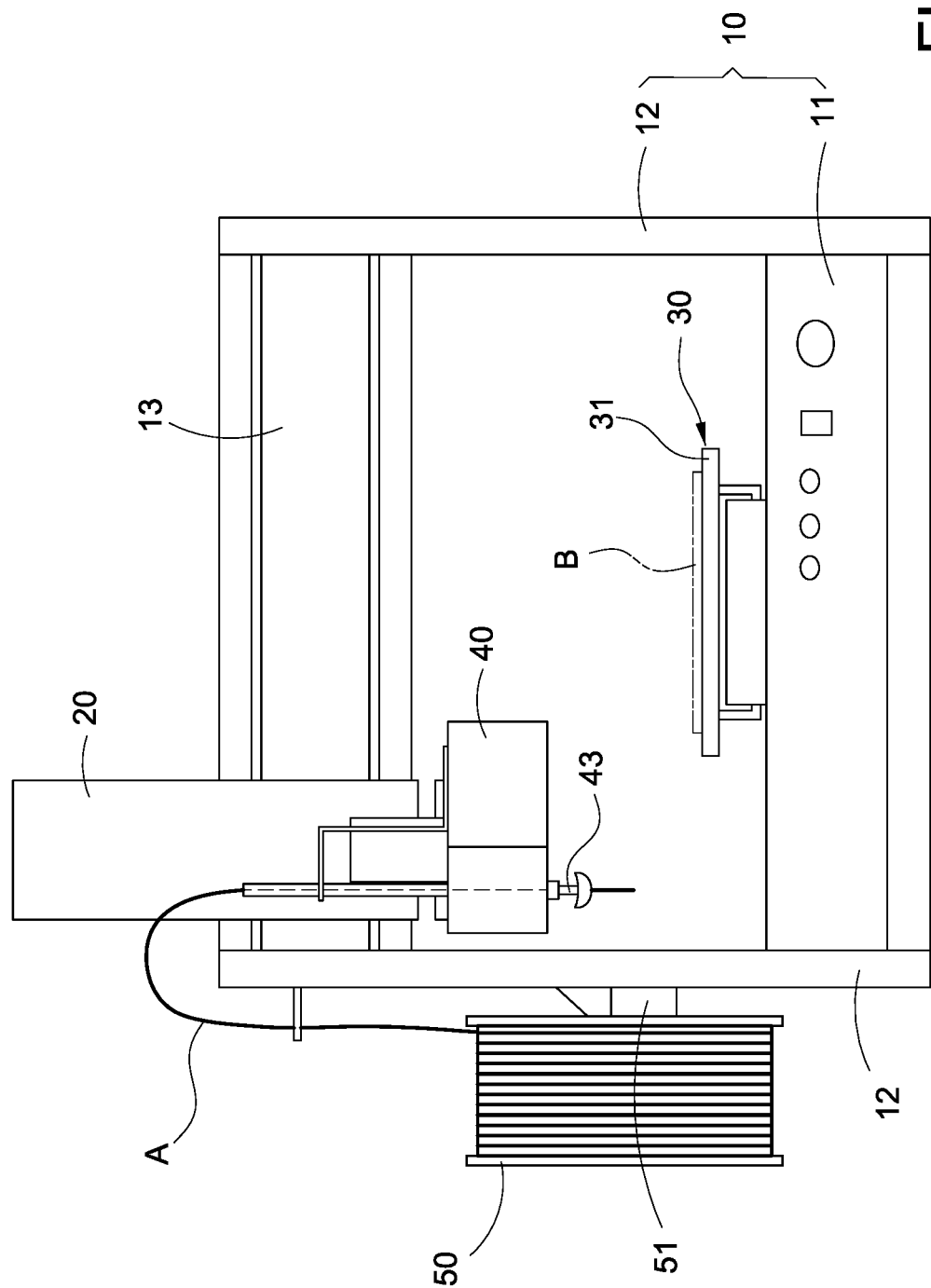
FIG. 2 is a plan view of the disclosure.

Please refer to FIGS. 1 and 2. The disclosure provides a semi-automatic wiring machine for laying a wire A onto a carrier B. and the semi-automatic wiring machine includes a chassis 10, a shifting mechanism 20, a carrying mechanism 30 and a wire leading mechanism 40.

In the embodiment, the wire A may be a conductive cord such as an electric wire, a conductive wire or a core wire. The carrier B may be a rubber pad or a silicone pad. The carrier B is formed with an annular groove B1. The semi-automatic wiring machine of the disclosure lays the wire A in the annular groove B1 to compose multiple coils A1 to form a semi-finished product of a mouse pad C with a function of wireless charge.

The chassis 10 includes a seat 11, two posts 12 and a guide rail 13. In the embodiment, two posts 12 are separately erected on two sides of the seat 11. The guide rail 13 is located on the top of the seat 11. Two ends of the guide rail 13 are separately connected between the two posts 12. The shifting mechanism 20 is disposed on the guide rail 13 and movable in a first axial direction x along the guide rail 13. The first axial direction x is parallel to the guide rail 13.

The carrying mechanism 30 is disposed under the guide rail 13 and includes a tray 31 for placing the carrier B. The tray 31 is movable along a second axial direction y. The second axial direction y is perpendicular to the first axial direction x. In detail, the moving direction of the tray 31 is perpendicular to the first axial direction x and compose a two-dimensional plane with the first axial direction x.

The wire leading mechanism 40 is connected to the shifting mechanism 20 and movable in a third axial direction z along the shifting mechanism 20. The third axial direction z is perpendicular to both the first axial direction x and the second axial direction y. In detail, the third axial direction z is perpendicular to the two-dimensional plane to compose a three-dimensional space, i.e., the wire leading mechanism 40 is movable along the upward and downward directions of the seat 11. The wire leading mechanism 40 includes a body 41, a wire conveying assembly 42 disposed in the body 41 and a wire leading head 43 connected to the body 41. The body 41 is formed with a through hole 411. The wire leading head 43 is formed with a wire leading hole 431 communicating with the through hole 411. The wire A is inserted in the through hole 411 and conveyed by the wire conveying assembly 42 to be output through the wire leading hole 431. Therefore, the wire A is laid on the carrier B by the movement of the shifting mechanism 20, the carrying mechanism 30 and the wire leading mechanism 40.

Figure 3:
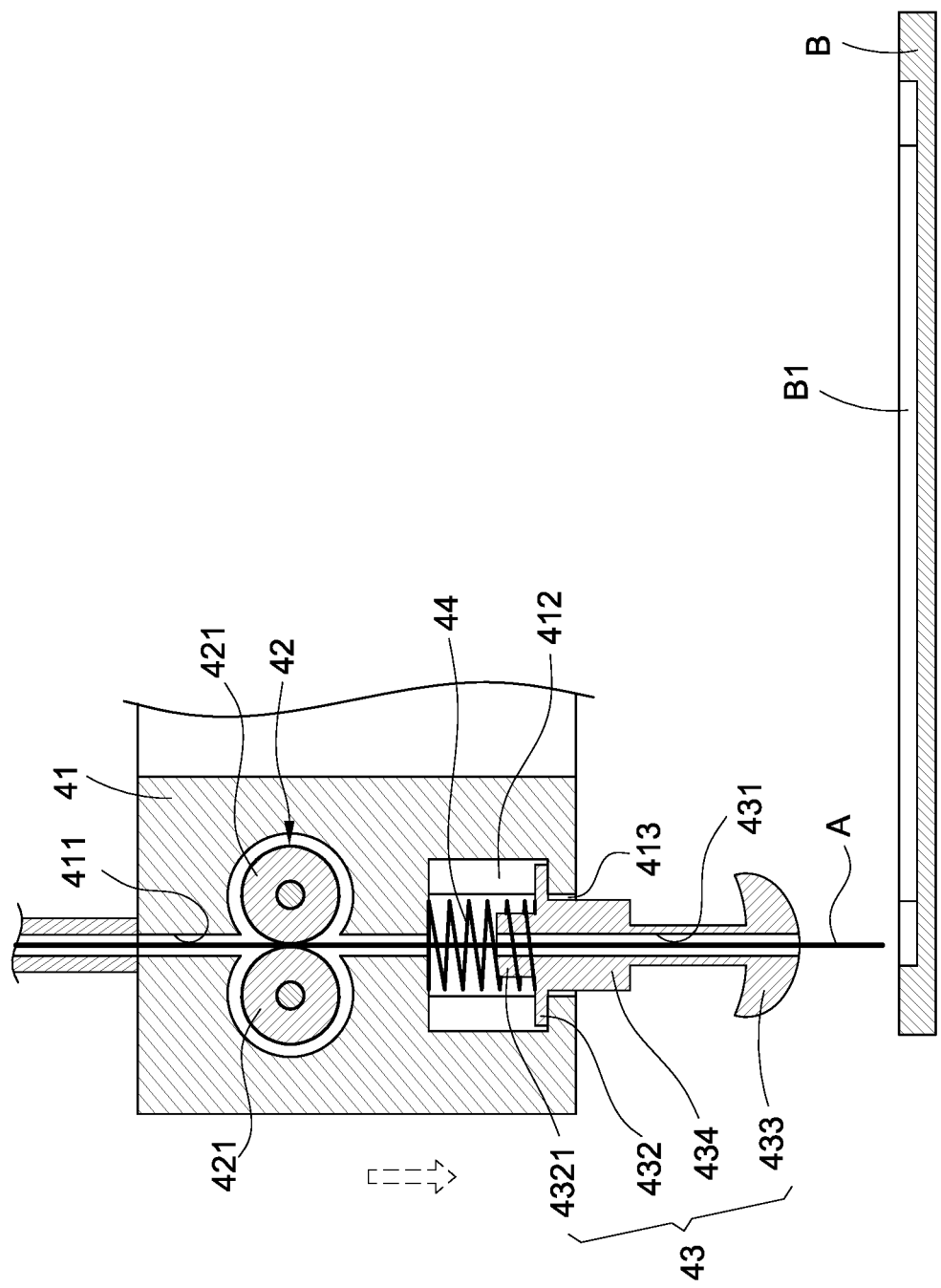
FIG. 3 is a cross-sectional view of the disclosure in use.
Figure 4:
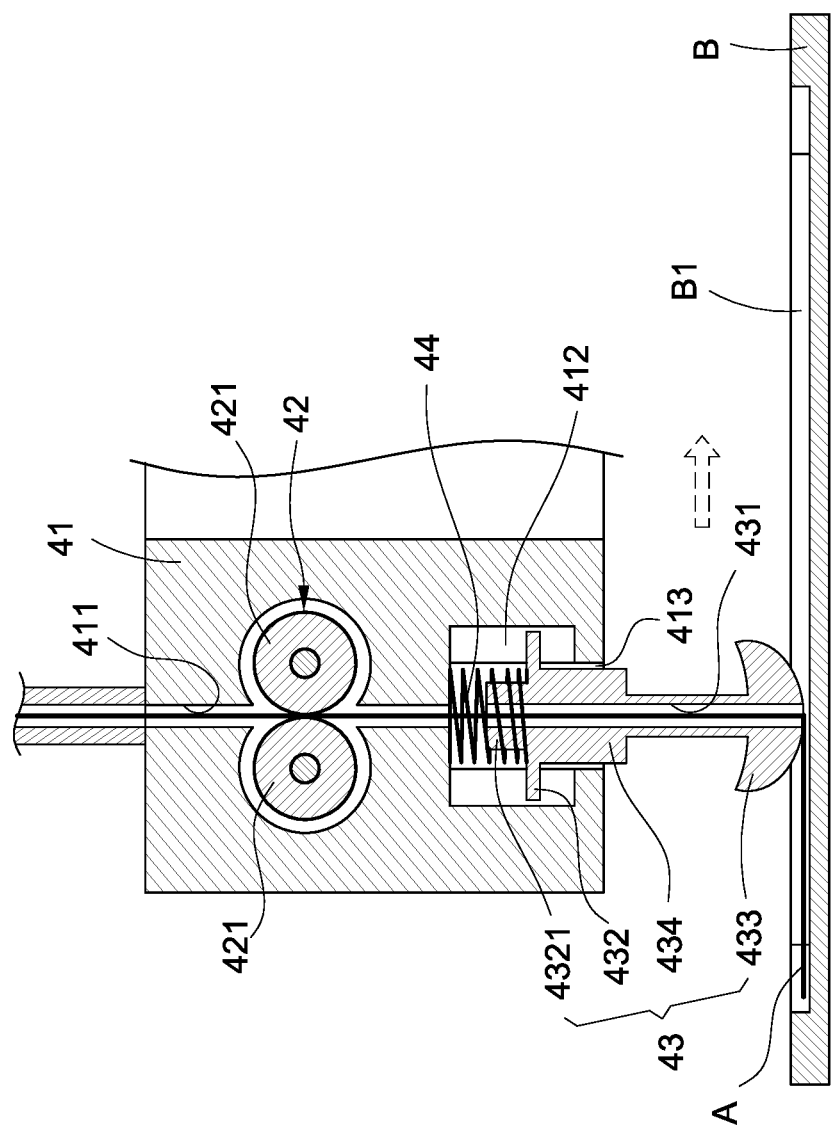
FIG. 4 s another cross-sectional view of the disclosure in use.
Figure 5:
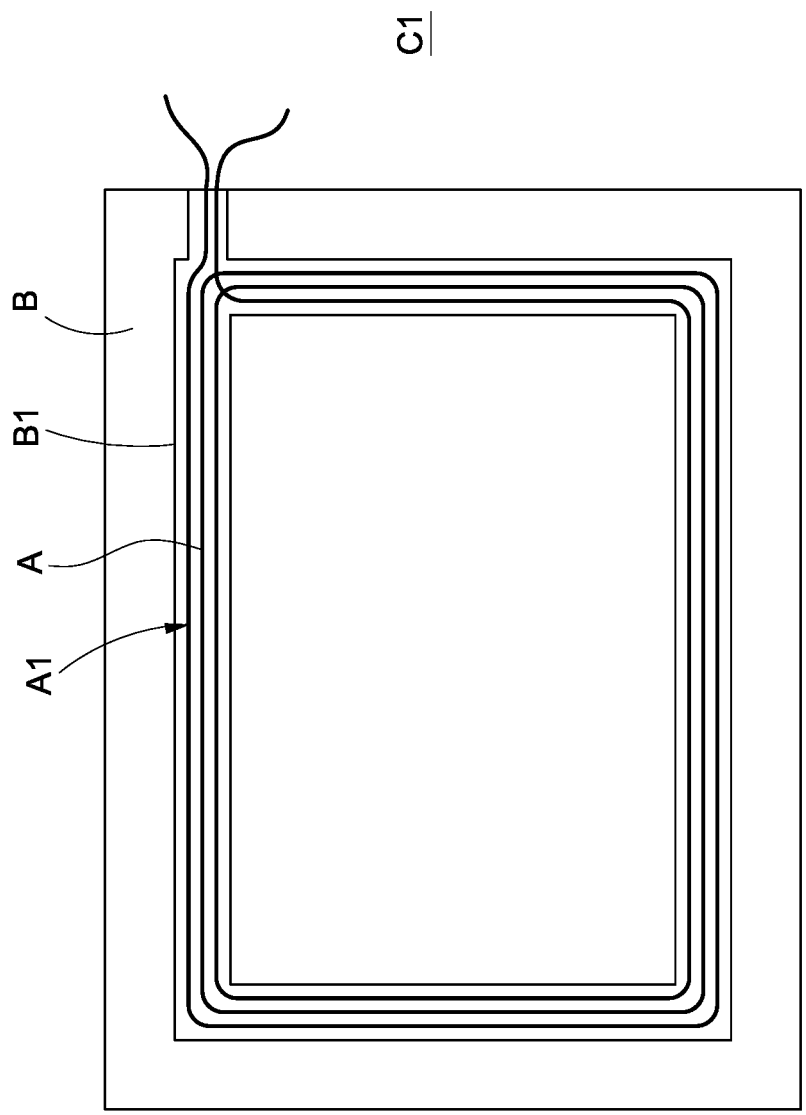
FIG. 5 is a top view of the wiring finished by the disclosure.
Figure 6:
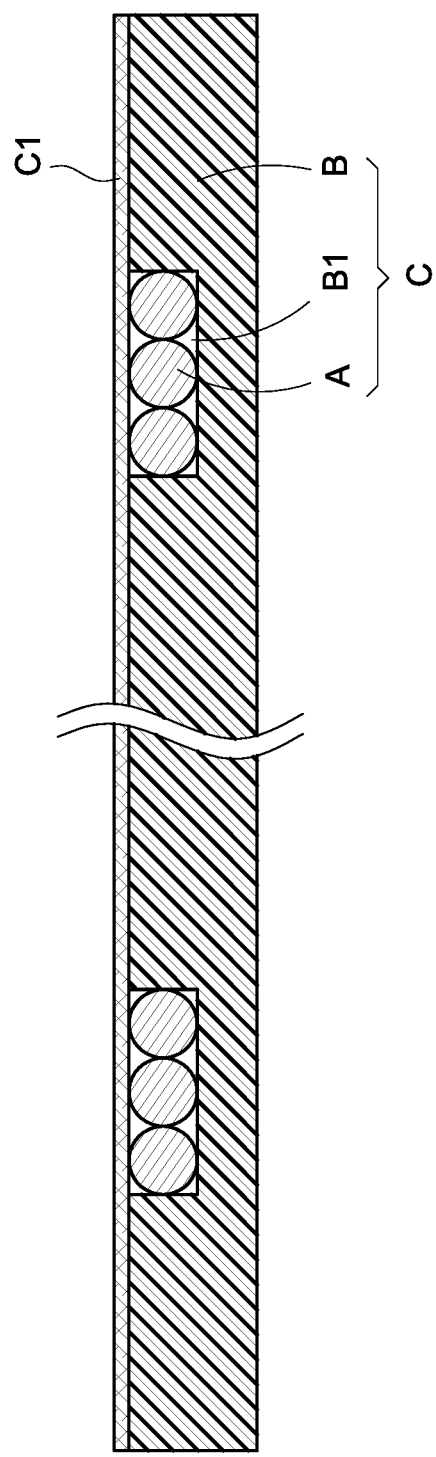
FIG. 6 is a cross-sectional view of FIG. 5.

Please refer to FIG. 3. A cross-section of the wire leading mechanism 40 is shown in FIG. 3. In the embodiment, the wire conveying assembly 42 includes two driving rollers 421 adjacent to each other. The driving rollers 421 are driven by a motor (not shown). The wire A is clamped between the driving rollers 421. The driving rollers 421 respectively rotate in a direction opposite to each other. In other words, rotation directions of the driving rollers 421 are opposite so as to output the wire A through the wire leading hole 431.

Further, the body 41 is provided with a chamber 412 and a sliding trough 413 communicating with the chamber 412. The wire leading head 43 includes an abutting portion 432, a pressing portion 433 and a moving portion 434 connected with the abutting portion 432 and the pressing portion 433. The abutting portion 432 is received (accommodated) in the chamber 412. The moving portion 434 movably passes through the sliding trough 413. Also, the abutting portion 432 has a connecting section 4321 protruded therefrom. The wire leading mechanism 40 further includes an elastic member 44. In the embodiment, the elastic member 44 is a spring. The elastic member 44 is received in the chamber 412 and adapted to sheathe the connecting section 4321 so as to be elastically clamped between the abutting portion 432 and the body 41. Thus, when the pressing portion 433 of the wire leading head 43 contacts the carrier B, the pressing portion 433 retracts toward the chamber 412 to compress the elastic member 44 so as to prevent the wire leading head 43 from being fractured or damaged. When the wire leading head 43 leaves the carrier B to be relieved from an external force, the wire leading head 43 returns to a fixed position by the elasticity of the elastic member 44. The cross-section of the pressing portion 433 is of a substantially arc shape. The wire leading head 43 may effectively press the wire A to prevent the wire A from warping when the wire leading mechanism 40 is laying the wire A.

Please refer back to FIGS. 1 and 2. The semi-automatic wiring machine of the disclosure further includes a wire supply reel 50 and a driver 51. The wire supply reel 50 is disposed on a lateral side of one of the posts 12 and driven by the driver 51 to rotate. The wire A is wound on the wire supply reel 50. An end of the wire A is inserted into the through hole 411 of the body 41 to be output to the wire leading head 43 by the wire conveying assembly 42 for laying. By the rotation of the wire supply reel 50, a certain length of the wire A continuously remains between the wire leading mechanism 40 and the wire supply reel 50 to prevent the wire A from twisting or fracturing because of unduly pulling when the wire A is conveyed by the wire conveying assembly 42.

In particular, please refer to FIGS. 3-6, which show the using process of the semi-automatic wiring machine of the disclosure. First, the shifting mechanism 20 and the tray 31 are moved to a proper initial wire-laying position, at the same time, an end of the wire A is located above an end of the annular groove B1 of the carrier B. Then, the wire leading mechanism 40 move downward to make the wire A be attached in the annular groove B1 as FIG. 3. An adhesive such as glue or double-sided tape (not shown) may be disposed in the annular groove B1 for adhesively fixing the wire A. Next, the height of the wire leading mechanism 40 is kept unvarying, and the shifting mechanism 20 and the tray 31 are used to implement movement along the first axial direction x and the second axial direction y to perform wire laying as FIG. 4. The wire leading mechanism 40 does not move upward until the laying of the coil A1 is finished, and the remaining part of the wire A is cut manually to form the semi-finished product of a mouse pad C as FIG. 5. The semi-finished product of a mouse pad C with the coil A1 being laid may be pressed with a protective layer C1 to protect the coil A1 in the annular groove B1 as FIG. 6.

While this disclosure has been described by means of specific embodiments, numerous modifications and variations could be made thereto by those skilled in the art without departing from the scope and spirit of this disclosure set forth in the claims.

What is claimed is:

1. A semi-automatic wiring machine, comprising:
   a chassis, comprising a guide rail;
   a shifting mechanism, disposed on the guide rail and movable in a first axial direction along the guide rail;
   a carrying mechanism, disposed under the guide rail, comprising a tray movable along a second axial direction, and the second axial direction being perpendicular to the first axial direction; and
   a wire leading mechanism, connected to the shifting mechanism and movable in a third axial direction along the shifting mechanism, the third axial direction being perpendicular to the first axial direction and the second axial direction, the wire leading mechanism comprising a body, a wire conveying assembly disposed in the body and a wire leading head connected to the body, wherein a wire is conveyed by the wire conveying assembly to be output by the wire leading head,
   wherein the body comprises a chamber and a sliding trough communicating with the chamber, the wire leading head comprises an abutting portion and a moving portion connected with the abutting portion, the abutting portion is accommodated in the chamber, and the moving portion movably passes through the sliding trough;
   wherein the wire leading mechanism further comprises an elastic member, the abutting portion comprises a connecting section protruded therefrom, and the elastic member is accommodated in the chamber and adapted to sheathe the connecting section to be elastically clamped between the abutting portion and the body.

2. The semi-automatic wiring machine of claim 1, wherein the wire leading head further comprises a pressing portion, and the moving portion is connected to the abutting portion and the pressing portion.

3. The semi-automatic wiring machine of claim 2, wherein a cross-section of the pressing portion is of an arc shape.

4. The semi-automatic wiring machine of claim 1, wherein the wire conveying assembly comprises two driving rollers, and the wire is clamped between the driving rollers.

5. The semi-automatic wiring machine of claim 4, wherein the driving rollers respectively rotate in a direction opposite to each other.

6. The semi-automatic wiring machine of claim 1, wherein the body comprises a through hole, the wire leading head comprises a wire leading hole communicating with the through hole, and one end of the wire is inserted in the through hole and is output through the wire leading hole.

7. The semi-automatic wiring machine of claim 1, wherein the chassis comprises a seat and two posts erected on the seat, and the guide rail is connected between the two posts.

8. The semi-automatic wiring machine of claim 7, further comprising: a wire supply reel, disposed on one of the posts for being wound by the wire.

* * * * *